United States Patent [19]
Inagaki et al.

[11] Patent Number: 5,375,917
[45] Date of Patent: Dec. 27, 1994

[54] BRAKING FORCE CONTROL SYSTEM OF VEHICLE

[75] Inventors: Hiromi Inagaki; Wataru Saito; Kazuya Sakurai; Yoshimichi Kawamoto, all of Saitama, Japan

[73] Assignee: Honda Giken Kogyo Kabushiki Kaisha, Tokyo, Japan

[21] Appl. No.: 179,722

[22] Filed: Jan. 11, 1994

[30] Foreign Application Priority Data

Jan. 13, 1993 [JP] Japan .................................. 5-004258

[51] Int. Cl.$^5$ ............................................. B60T 8/32
[52] U.S. Cl. ................................... 303/100; 303/15; 303/117.1; 303/119.1; 303/102; 303/113.4; 188/181 C
[58] Field of Search ............... 303/100, 115.4, 117.1, 303/119.1, 119.2, 113.1, 93, 97, 15, 99, 92, 102, 103, 101, 105, 106, 111, 110, 113.4, 116.1; 180/197; 364/426.01, 426.02, 426.03; 188/181 A, 181 C

[56] References Cited

U.S. PATENT DOCUMENTS

| | | | |
|---|---|---|---|
| 4,940,291 | 7/1990 | Sato | 303/15 |
| 5,083,075 | 1/1992 | Sato et al. | 303/92 X |
| 5,106,167 | 4/1992 | Matsuda | 303/117.1 |
| 5,248,190 | 9/1993 | Sato et al. | 303/113.4 |

Primary Examiner—Douglas C. Butler
Attorney, Agent, or Firm—Armstrong, Westerman, Hattori, McLeland & Naughton

[57] ABSTRACT

A braking force control system of a vehicle includes a deviation reference control quantity determining device for determining an operation control quantity for the actuator on the basis of a deviation between a target deceleration determined on the basis of a quantity of operation of a brake operating member and a detected deceleration of the vehicle. In this control system, the level of operation speed is judged in accordance with whether or not the variation per unit time in quantity of operation of the brake operating member exceeds a preset value. Following two states are switched over from one to another by a switch device: a state 1) in which the operation of the actuator is controlled with an operation control quantity determined in the deviation reference control quantity determining device, when it is decided that the operation speed is slow or low, and a state 2) in which the operation of the actuator is controlled with an operation control quantity determined in an operation quantity reference quantity determining device for determining the operation control quantity on the basis of the quantity of operation of the brake operating member, when the operation speed is fast or high. Thus, the generation of an overshooting can be avoided to improve the responsiveness.

4 Claims, 7 Drawing Sheets

BRAKING FORCE CONTROL SYSTEM OF VEHICLE

BACKGROUND OF THE INVENTION

1. Field of the Invention

The present invention relates to a braking force control system of a vehicle, comprising an actuator capable of adjusting a braking force of a wheel brake, an operation quantity detecting means for detecting the quantity of operation of a brake operating member, a target deceleration determining means for determining a target deceleration of the vehicle on the basis of the operation quantity detected by the operation quantity detecting means, a deceleration detecting means for detecting a deceleration of the vehicle, and a deviation reference control quantity determining means for determining an operation control quantity for the actuator on the basis of a deviation between the target deceleration determined in the target deceleration determining means and the deceleration detected by the deceleration detecting means.

2. Description of the Prior Art

Such systems have conventionally been known, for example, from Japanese Patent Application Laid-open No. 178062/89 and the like.

In the above prior art system, a feed-back control of the deceleration of the vehicle is carried out, but if the responsiveness of the control is increased, the generation of an over-shooting cannot be avoided.

SUMMARY OF THE INVENTION

Accordingly, it is an object of the present invention to provide a braking force control system in a vehicle, wherein the generation of an over-shooting can be avoided and responsiveness is improved.

To achieve the above object, according to a first aspect and feature of the present invention, there is provided a braking force control system for a vehicle, comprising an actuator for adjusting a braking force of a wheel brake, an operation quantity detecting means for detecting the quantity of operation of a brake operating member, a target deceleration determining means for determining a target deceleration of the vehicle on the basis of the operation quantity detected by the operation quantity detecting means, a deceleration detecting means for detecting a deceleration of the vehicle, a deviation reference control quantity determining means for determining an operation control quantity of the actuator on the basis of a deviation between the target deceleration determined in the target deceleration determining means and the deceleration detected by the deceleration detecting means, an operation-quantity reference control quantity determining means for determining an operation control quantity of the actuator on the basis of the operation quantity detected by the operation quantity detecting means, a speed-level judging means for judging a level of speed of operation of the brake operating member in accordance with whether or not the variation per unit time in operation quantity detected by the operation quantity detecting means exceeds a preset value, and a switch means for switching from one to another in the following states: a state 1) in which the operation of the actuator is controlled with the operation control quantity determined in the deviation reference control quantity determining means, when it is decided in the speed-level judging means that the operation speed is slow; and, a state 2) in which the operation of the actuator is controlled with the operation control quantity determined in the operation-quantity reference control quantity determining means, when it is decided, in the speed-level judging means, that the operation speed is fast.

With the above arrangement, when the braking operating is fast (hard braking), the control quantity is determined in the operation-quantity reference control quantity determining means, and when the braking operating is slow, the control quantity is determined in the deviation reference control quantity determining means. Thus, the generation of an overshooting can be avoided and responsiveness improved.

According to a second aspect and feature of the present invention, there is provided a braking force control system in a vehicle, comprising a fluid pressure circuit for applying a braking fluid pressure to a wheel brake, an operation quantity detecting means for detecting a quantity of operation of a brake operating member, a target deceleration determining means for determining a target deceleration of the vehicle on the basis of the operation quantity detected by the operation quantity detecting means, a deceleration detecting means for detecting a deceleration of the vehicle, a means for feed-back controlling the braking fluid pressure on the basis of the target deceleration determined in the target deceleration determining means as well as the deceleration detected by the deceleration detecting means, a means for open controlling the braking fluid pressure on the basis of the operation quantity detected by the operation quantity detecting means, a speed-level judging means for judging a level of speed of operation of the brake operating member in accordance with whether or not the variation per unit time in operation quantity detected by the operation quantity detecting means exceeds a preset value, and a switch means for selecting the feed-back control, when it is decided in the speed-level judging means that the operation speed is slow, and to select the open control, when it is decided in the speed-level judging means that the operation speed is fast.

With the above arrangement, when the braking operation is fast, the open control is carried out, and when the braking operation is slow, the feed-back control is carried out. Thus, the generation of an overshooting can be avoided and responsiveness is improved.

Further, according to a third aspect and feature of the present invention, there is provided a braking force control system in a vehicle, comprising an adjusting means for adjusting the speed of a vehicle in accordance with the quantity of operation of a brake operating member, an operation quantity detecting means for detecting the quantity of operation of the operating member, a speed variation detecting means for detecting a variation in speed of the Vehicle, a means for feed-back controlling the adjusting means on the basis of a target value based on the operation quantity detected by the operation quantity detecting means and a detection value based on the variation in speed of the vehicle and detected by the speed variation detecting means, a means for open controlling the adjusting means on the basis of the operation quantity detected by the operation quantity detecting means, a speed-level judging means for judging a level of speed of operation of the brake operating member in accordance with whether or not the variation per unit time in operation quantity detected by the operation quantity detecting means exceeds a preset value, and a switch means for selecting the feed-back control, when it is decided in the speed-level judging means that the operation speed is slow, and to select the open control, when it is decided in the speed-level judging means that the operation speed is fast.

With the above arrangement, when the braking operation is fast, the open control is carried out, and when the braking operation is slow, the feed-back control is carried out. Thus, the generation of an overshooting can be avoided and responsiveness is improved.

The above and other objects, features and advantages of the invention will become apparent from the following description of a preferred embodiment, taken in conjunction with the accompanying drawings.

DESCRIPTION OF THE PREFERRED EMBODIMENTS

The present invention will now be described by way of a preferred embodiment in connection with the accompanying drawings.

Figure 1:
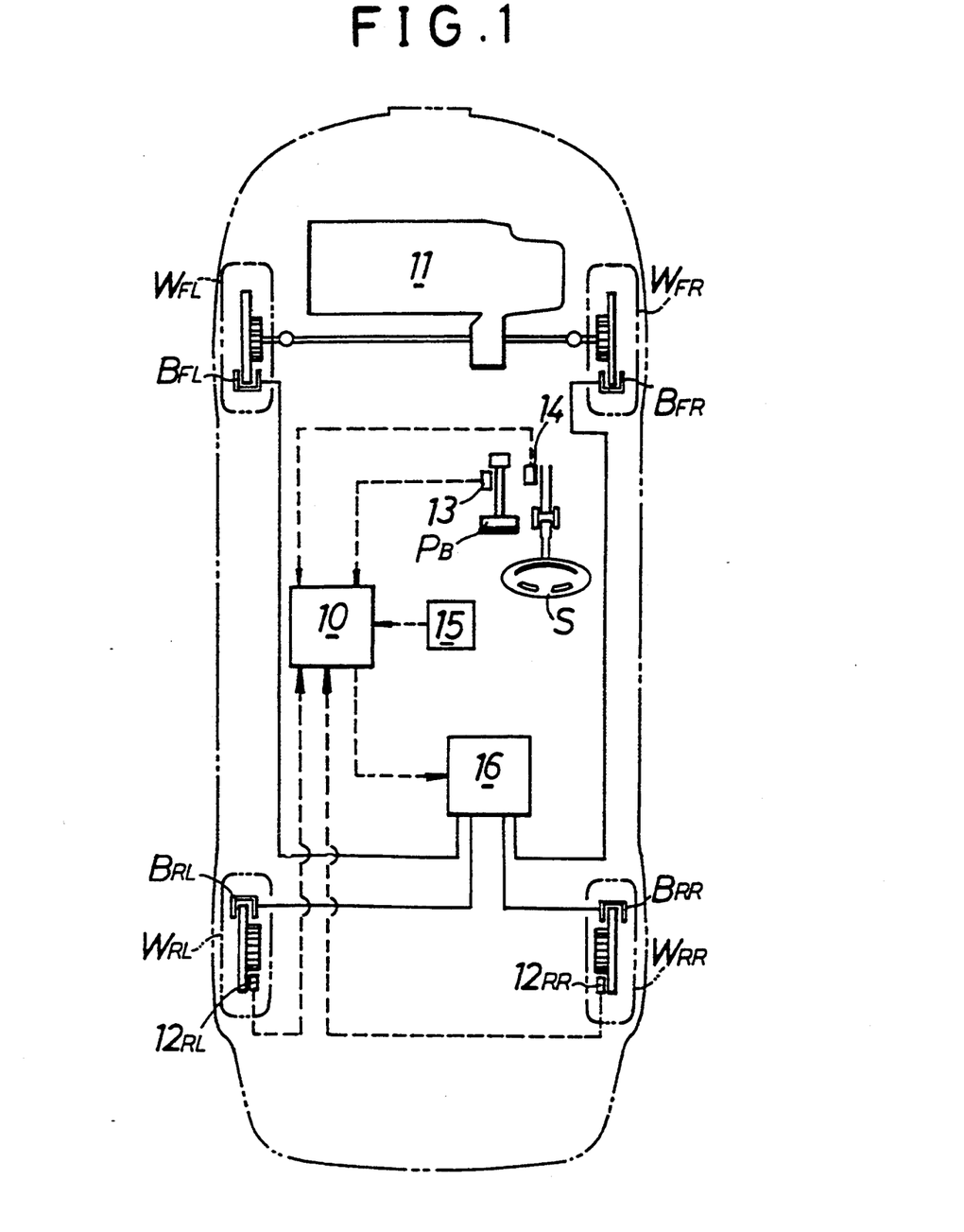
FIG. 1 is an illustration of a braking system in a vehicle.

Referring first to FIG. 1, a power from a power unit 11, including an engine and a transmission, is transmitted to left and right front wheels $W_{FL}$ and $W_{FR}$ which are driving wheels. Wheel brakes $B_{FL}$ and $B_{FR}$ are mounted on the front wheels $W_{FL}$ and $W_{FR}$. Wheel brakes $B_{RL}$ and $B_{RR}$ are mounted on the rear wheels $W_{RL}$ and $W_{RR}$ which are follower wheels. Wheel speed detectors $12_{RL}$ and $12_{RR}$ are also mounted on the rear wheels $W_{RL}$ and $W_{RR}$. A braking fluid pressure is applied from a braking fluid pressure circuit 16 to the wheel brakes $B_{FL}$, $B_{FR}$, $B_{RL}$ and $B_{RR}$.

Figure 2:
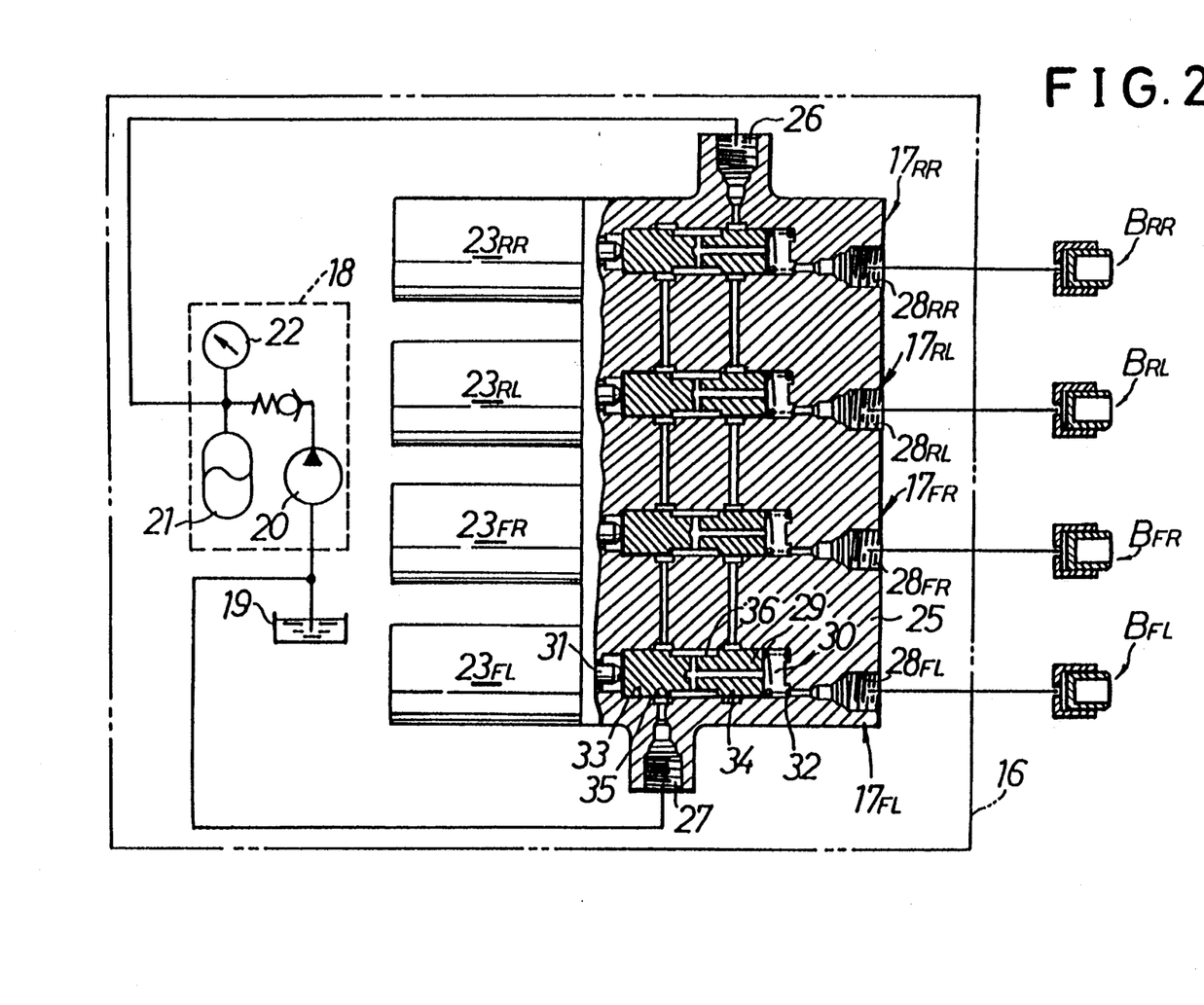
FIG. 2 is an illustration of the arrangement of a braking fluid pressure circuit.

Referring to FIG. 2, the braking fluid pressure circuit 16 includes a modulator $17_{FL}$, serving as an actuator capable of adjusting the braking force of the left front wheel brake $B_{FL}$, a modulator $17_{FR}$, serving as an actuator capable of adjusting the braking force of the right front wheel brake $B_{FR}$, a modulator $17_{RL}$, capable of adjusting the braking force of the left rear wheel brake $B_{RL}$, a modulator $17_{RR}$, capable of adjusting the braking force of the right rear wheel brake $B_{RR}$, and a fluid pressure source 18 common to the modulators $17_{FL}$, $17_{FR}$, $17_{RL}$ and $17_{RR}$.

The fluid pressure source 18 includes a fluid pressure pump 20, for pumping a working fluid from a working fluid tank 19, an accumulator 21, connected to the fluid pressure pump 20, and a pressure switch 22, for controlling the operation of the fluid pressure pump 20.

The modulators $17_{FL}$, $17_{FR}$, $17_{RL}$ and $17_{RR}$ are juxtaposed, in parallel to one another, in a common housing 25. These modulators basically have the same construction, and therefore, only the modulator $17_{FL}$ will be described below in detail, and the detailed description of the modulators $17_{FR}$, $17_{RL}$ and $17_{RR}$ is omitted.

The housing 25 is provided with an input port 26, connected to the fluid pressure source 18, a release port 27, leading to the working fluid tank 19, and four output ports $28_{FL}$, $28_{FR}$, $28_{RL}$ and $28_{RR}$, individually connected to the brakes $B_{FL}$, $B_{FR}$, $B_{RL}$ and $B_{RR}$, respectively.

The modulator $17_{FL}$ includes a spool 29, slidably received in the housing 25, and a linear solenoid $23_{FL}$, mounted to the housing 25 for urging the spool 29 axially. The linear solenoid $23_{FL}$ has a driving rod 31 coaxially abutting against one end of the spool 29. An output chamber 30 is defined in the housing 25, and the other end of the spool 29 faces the output chamber 30. The output chamber 30 leads to the output port $28_{FL}$, and a return spring 32 is accommodated within the output chamber 30 for biasing the spool 29 toward the linear solenoid $23_{FL}$. Thus, the spool 29 is normally in abutment against the driving rod 31 by a spring force of the return spring 32, and the spool 29 and the linear solenoid $23_{FL}$ are operatively connected to each other.

The housing 25 is provided with a cylinder bore 33 in which the spool 29 is slidably received. Provided in an inner surface of the cylinder bore 33, at axially spaced locations, are an annular groove 34, leading to the input port 26, and an annular groove 35, leading to the release port 27. An annular recess 36 is provided in an outer surface of the spool 29 to normally lead to the output chamber 30. The spool 29 switches over between a state in which it permits the annular recess 36 to lead to the annular groove 34 to put the input port 26 and the output chamber 30 and, thus, the output port $28_{FL}$ into communication with each other, and a state in which it permits the annular recess 36 to lead to the annular groove 35 to put the output chamber 30 and the release port 27 into communication with each other, by an axial displacement in position of the spool 29, depending upon the magnitude relationship between the thrust of the linear solenoid $23_{FL}$, acting on an axially one end of the spool 29, and the fluid pressure force in the output chamber 30, acting on the axially other end of the spool.

The linear solenoid $23_{FL}$ generates a thrust dependent upon an input quantity of electricity received thereto, and the fluid pressure in the output chamber 30, i.e., the fluid pressure applied through the output port $28_{FL}$ to the left front wheel brake $B_{FL}$ can be controlled arbitrary by controlling the applied electric power quantity of the linear solenoid $23_{FL}$.

Even as to the other modulators $17_{FR}$, $17_{RL}$ and $17_{RR}$, the fluid pressure applied to the wheel brakes $B_{FR}$, $B_{RL}$ and $B_{RR}$ can be likewise controlled by controlling the applied electric power quantity of the linear solenoids $23_{FR}$, $23_{RL}$ and $23_{RR}$, as the modulator $17_{FL}$.

Referring again to FIG. 1, the wheel speed detectors $12_{RL}$ and $12_{RR}$, a load cell 13, serving as an operation quantity detecting means, a steering sensor 14 and a deceleration sensor 15, serving as a deceleration detecting means, are connected to a control unit 10. This control unit 10 controls the applied electric power quantity of each of the linear solenoids $23_{FL}$, $23_{FR}$, $23_{RL}$ and $23_{RR}$ in the modulators $17_{FL}$, $17_{FR}$, $17_{RL}$ and $17_{RR}$ so as to control the braking force of each of the wheel brakes $B_{FL}$, $B_{FR}$, $B_{RL}$ and $B_{RR}$. The load cell 13 is for detecting a depression force on a brake pedal $P_B$ serving as a brake operating member. However, by arranging the load cell 13 such that a reaction force corresponding to a quantity of depression of the brake pedal $P_B$, i.e., a quantity of operation thereof is applied to the brake pedal $P_B$, the load cell 13 can also detect the quantity of operation of the brake pedal $P_B$. The steering sensor 14 is added to a steering means S to detect an angle of operation of the steering means S, i.e., a steering quantity. The deceleration sensor 15 detects a longitudinal deceleration of a vehicle.

Figure 3:
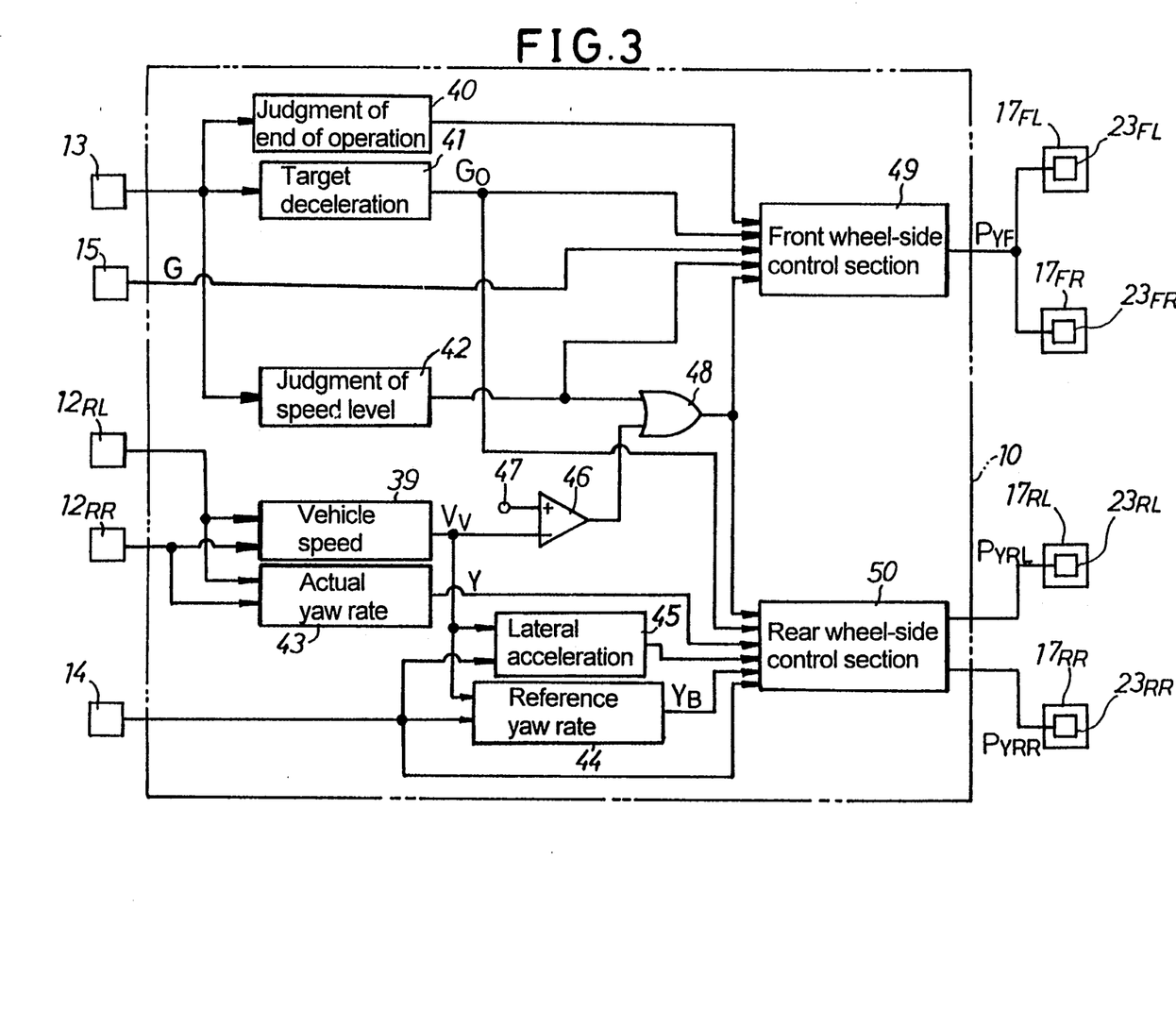
FIG. 3 is a block diagram illustrating the arrangement of a control unit.

Referring to FIG. 3, the control unit 10 includes a vehicle speed detecting means 39 for calculating a vehicle speed $V_V$ on the basis of detection values detected by the wheel speed detectors $12_{RL}$ and $12_{RR}$ which detect the speeds of the left and right rear wheels $W_{RL}$ and $W_{RR}$ which are the follower wheels; an operation-end judging means for judging whether or not the operation of the brake pedal $P_B$ is ended by using a detection value detected by the load cell 13; a target deceleration determining means 41 for determining a target deceleration of the vehicle in accordance with the detection value detected by the load cell 13, i.e., the quantity of operation of the brake pedal $P_B$; a speed-level judging means 42, for judging the level of operation speed in accordance with whether or not a value in variation per unit time in operation quantity detected by the load cell 13 exceeds a preset value; an actual yaw rate detecting means 43, for detecting an actual yaw rate Y, which is an actual turning level, by a difference between the detection values detected by the wheel speed detectors $12_{RL}$ and $12_{RR}$; a reference yaw rate determining means 44, for determining a reference yaw rate $Y_B$, which is a target turning level on the basis of the vehicle speed $V_V$, determined in the vehicle speed detecting means 39, as well as a detection value detected by the steering sensor 14; a lateral acceleration evaluating means 45, for evaluating a lateral acceleration of the vehicle on the basis of the vehicle speed $V_V$ and the detection value detected by the steering sensor 14; a comparator 46, for outputting a high level signal when the vehicle speed $V_V$ determined in the vehicle speed detecting means 39 is lower than a judging speed (e.g., 10 km/hr) received thereto through a reference terminal 47; an OR gate 48 into which output signals from the speed-level judging means 42 and the comparator 46 are received in parallel; a front wheel-side control section 49, for collectively controlling the quantities of operation of the modulators $17_{FL}$ and $17_{FR}$, i.e., the applied electric power quantities of the linear solenoids $23_{FL}$ and $23_{FR}$ so as to control the braking forces of the left and right front wheel brakes $B_{FL}$ and $B_{FR}$ to the same level; and a rear wheel-side control section 50 for independently controlling the quantities of operation of the modulators $17_{RL}$ and $17_{RR}$, i.e., the applied electric power quantities of the linear solenoids $23_{RL}$ and $23_{RR}$ so as to independently control the braking forces of the left and right rear wheel brakes $B_{RL}$ and $B_{RR}$.

The operation-end judging means 40 judges whether or not the operation of the brake pedal $P_B$ is ended by the detection value detected by the load cell 13. The operation-end judging means 40 outputs a high level signal, after a lapse of a preset delay time from the judgment of the end of the operation. In the actual yaw rate detecting means 43, an actual yaw rate Y is determined by multiplying a difference between the detection values detected by the wheel speed detectors $12_{RL}$ and $12_{RR}$ which detect the speeds of the left and right rear follower wheels $W_{RL}$ and $W_{RR}$, by a predetermined constant with respect to treads of the left and right rear wheels $W_{RL}$ and $W_{RR}$. In the reference yaw rate determining means 44, a reference value, which is a standard for a yaw rate to be generated when the steering operation in an amount corresponding to the steering angle detected by the steering sensor 14 is performed at the vehicle speed $V_V$, is determined as a reference yaw rate $Y_B$.

Figure 4:
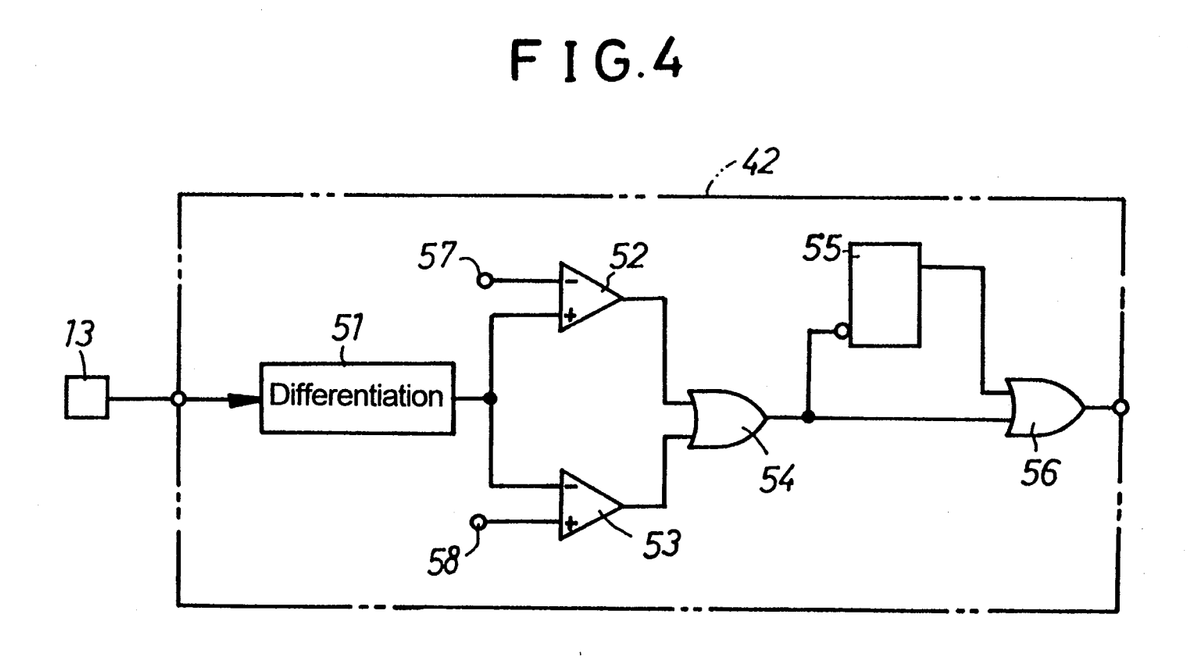
FIG. 4 is a block diagram illustrating the arrangement of a speed-level judging means.

Referring to FIG. 4, the speed-level judging means 42 includes a differentiating circuit 51, a pair of comparators 52 and 53, a monostable circuit 55, and a pair of OR gates 54 and 56.

The differentiating circuit 51 determines a value of variation per unit time in the operation quantity applied to the brake pedal $P_B$ by differentiating a depression force obtained in the load cell 13. An output from the differentiating circuit 51 is inputted to a non-inverted input terminal of the comparator 52 and to an inverted input terminal of the comparator 53. Outputs from the comparators 52 and 53 are inputted, in parallel, to the OR gate 54. A threshold value (e.g., +15 kg f/sec), in a depressing direction of the brake pedal, is delivered from the reference terminal 57 to an inverted input terminal of the comparator 52. And a threshold value (e.g., −15 kg f/sec), in a returning direction of the brake pedal, is delivered from a reference terminal 58 to a non-inverted input terminal of the comparator 53. Thus, if one of the speeds of operation of the brake pedal $P_B$, in the depression and returning directions of the pedal, exceeds the respective threshold values, an output from the OR gate 54 becomes a high level.

The monostable circuit 55 outputs a high level signal, which is sustained for a given time, from an instant when the output from the OR gate 54 is changed from a high level to a low level. The output from the OR gate 54 is applied, in an inverted manner, to the monostable circuit 55. The output from the OR gate 54 and an output from the monostable circuit 55 are applied, in parallel, to the OR gate 56. Thus, when it is decided that the speed of operation of the brake pedal $P_B$ is changed from a low value to a high value (i.e., from a slow braking state to a hard braking state), a high level signal is immediately delivered from the OR gate 56, i.e., from the speed-level judging means 42. However, when the operation speed is changed from the high value to the low value (i.e., from the hard braking state to the slow braking state), the output signal from the speed-level judging means 42 is delayed for a given time and changed from the high level to a low level.

Referring again to FIG. 3, the out put signal from the speed-level judging means 42 and the output signal from the comparator 46 are applied in parallel to the OR gate 48. The OR gate 48 outputs a high level signal, when at least one of the following two conditions is established: a condition 1) in which the operation speed of the brake pedal $P_B$ is fast, and a condition 2) in which the vehicle speed $V_V$ is lower than a judgment speed, e.g., 10 km/hr.

Figure 5:
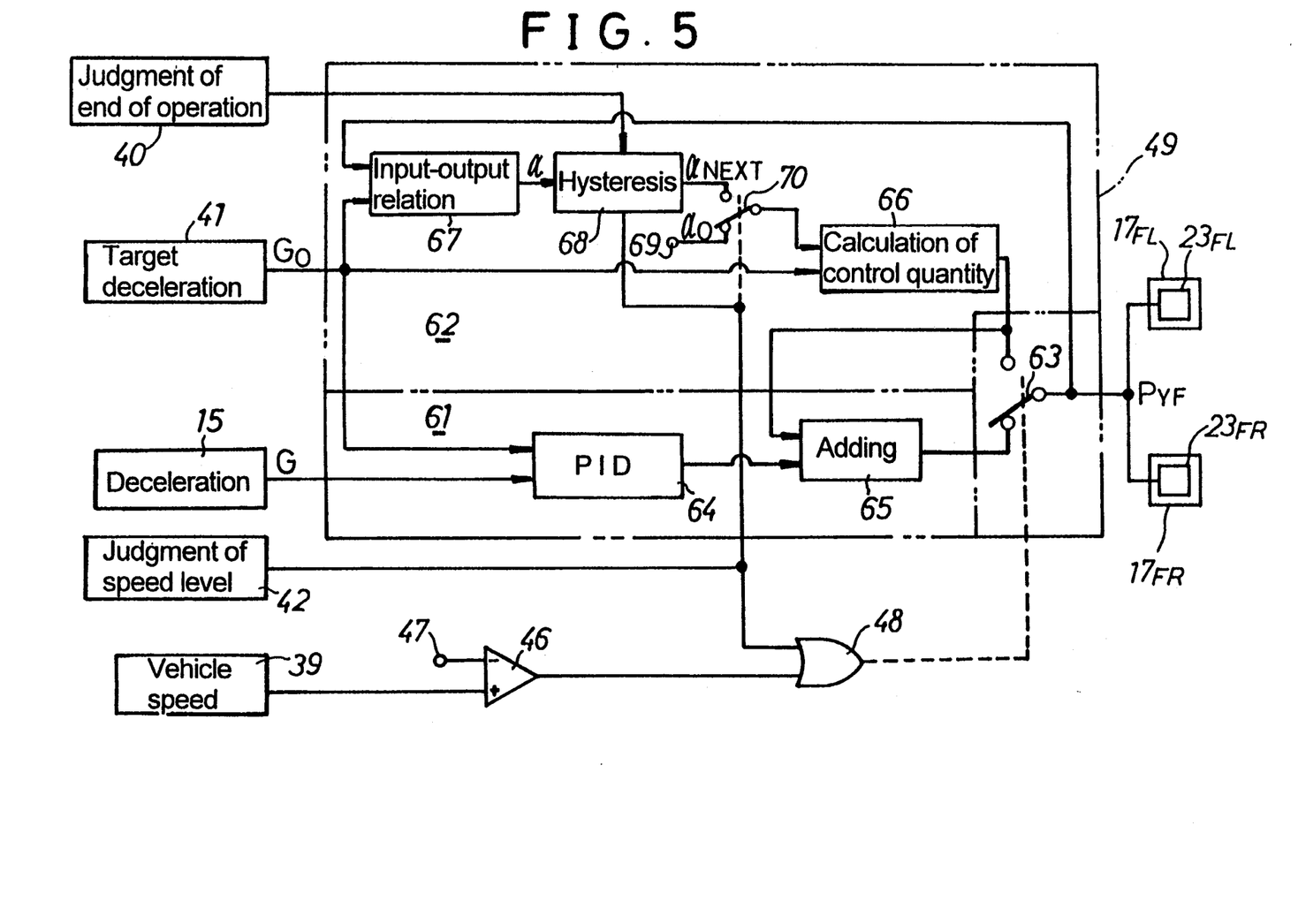
FIG. 5 is a block diagram illustrating the arrangement of a front wheel-side control section.

Referring to FIG. 5, the front wheel-side control section 49 includes a deviation reference control quantity determining means 61 for determining an operation control quantity for each of the modulators $17_{FL}$ and $17_{FR}$ on the basis of a deviation between a target deceleration $G_0$, determined in the target deceleration determining means 41, and a deceleration G, detected by the deceleration sensor 15; an operation-quantity reference control quantity determining means 62 for determining an operation control quantity for each of the modulators $17_{FL}$ and $17_{FR}$ on the basis of the target deceleration $G_0$ determined in accordance with the operation quantity detected by the load cell 13; and a switch means 63 (as a switching means) for selecting, as an operation control quantity $P_{YF}$ for each of the modulators $17_{FL}$ and $17_{FR}$, either one of output signals from the deviation reference control quantity determining means 61 and the operation-quantity reference control quantity determining means 62 in accordance with the output signal from the OR gate 48.

The deviation reference control quantity determining means 61 includes a PID calculating circuit 64 for calculating a PID control quantity on the basis of the deviation between the target deceleration $G_0$, determined in the target deceleration determining means 41, and the deceleration G, detected by the deceleration sensor 15; and an adding circuit 65 for adding the PID control quantity, determined in the calculating circuit 64, to the control quantity, determined in the operation-quantity reference control quantity determining means 62, to provide an operation control quantity for each of the modulators $17_{FL}$ and $17_{FR}$.

The operation-quantity reference control quantity determining means 62 includes a control quantity calculating circuit 66 for calculating the control quantity in accordance with the target deceleration $G_0$, obtained in the target deceleration determining means 41; an input-output relation calculating circuit 67 for calculating a relation between the target deceleration $G_0$, determined on the basis of the operation quantity detected in the operation quantity detecting means 13 and a value determined on the basis of the deceleration G, detected by the deceleration sensor 15; a hysteresis calculating circuit 68 for calculating a hysteresis of value obtained in the input-output relation calculating circuit 67; and a switch circuit 70 for selecting any one of a reference terminal 69 and the hysteresis calculating circuit 68 in accordance with the output from the speed-level judging means 42 to supply it to the control quantity calculating circuit 66.

In the control quantity calculating circuit 66, a calculation according to the following equation (1) is carried out on the basis of the target deceleration $G_0$ applied to the circuit 66, and a control quantity $P_Y$ is obtained:

$$P_Y = \alpha_0 \times G_0 + \beta \quad (1)$$

As can be seen in the above equation (1), the control quantity $P_Y$ is given in the form of a primary straight line having an inclination represented by $\alpha_0$ and an intercept represented by $\beta$.

The input-output relation calculating circuit 67 calculates, in terms of $\alpha$, a ratio ($P_{YF}/G_0$) between the target deceleration $G_0$ and the operation control quantity $P_{YF}$ outputted from the switch means 63 as a value determined on the basis of the deceleration G. The hysteresis calculating circuit 68 averages past four values of $\alpha$ applied thereto from the input-output relation calculating circuit 67 to provide an average value $\alpha_{NEXT}$. This hysteresis calculating circuit 68 renewingly repeats such calculation until a high level signal is received thereto from the speed-level judging means 42, but if the high level signal is inputted from the speed-level judging means 42, the circuit 68 retains a value $\alpha_{NEXT}$ at the time when such a high level signal is inputted. Moreover, the hysteresis calculating circuit 68 restores the value $\alpha_{NEXT}$ to an initial value, when a high level signal is inputted thereto from the operation-end judging means 40.

The switch circuit 70 switches over following two states from one to another: a state 1) in which the value $\alpha_0$ inputted to the switch circuit 70 from the reference terminal 69 is applied to the control quantity calculating circuit 66 when the output from the speed-level judging means 42 is of a low level, and a state 2) in which the value $\alpha_{NEXT}$, outputted from the hysteresis calculating circuit 68, is applied to the control quantity calculating circuit 66 when the output from the speed-level judging means 42 is of a high level. Moreover, when the hysteresis calculation value $\alpha_{NEXT}$ is inputted to the control quantity calculating circuit 66 from the hysteresis calculating circuit 68, the control quantity calculating circuit 66 replaces the value $\alpha_0$ in the equation (1) by the hysteresis calculation value $\alpha_{NEXT}$.

The switch means 63 switches over following two states from one to another: a state 1) in which the output from the adding circuit 65 in the deviation reference control quantity determining means 61 is outputted as the operation control quantity $P_{YF}$ when the output from the OR gate 48 is of a low level, and a state in which the output from control quantity calculating circuit 66 in the operation-quantity reference control quantity determining means 62 is outputted as the operation control quantity $P_{YF}$ when the output from the OR gate 48 is of a high level.

By such front wheel-side control section 49, when the vehicle speed $V_Y$ is equal to or more than 10 km/hr and when the speed of operation of the brake pedal $P_B$ is slow, the linear solenoids $23_{FL}$ and $23_{FR}$ in the modulators $17_{FL}$ and $17_{FR}$ are controlled in a feed-back manner by the operation control quantity $P_{YF}$ determined in the deviation reference control quantity determining means 61; and either when the speed of operation of the brake pedal $P_B$ is fast, or when the vehicle speed $V_Y$ is less than 10 km/hr, the linear solenoids $23_{FL}$ and $23_{FR}$ are controlled in an open manner by the operation control quantity $P_{YF}$ determined in the operation-quantity reference control quantity determining means 62. Moreover, when the feed-back control is changed over to the open control, the relationship of the operation control quantity $P_{YF}$ with respect to the target deceleration $G_0$ is changed on the basis of the hysteresis of the relation between the target deceleration $G_0$ and the operation control quantity $P_{YF}$ during the feed-back control.

Figure 6:
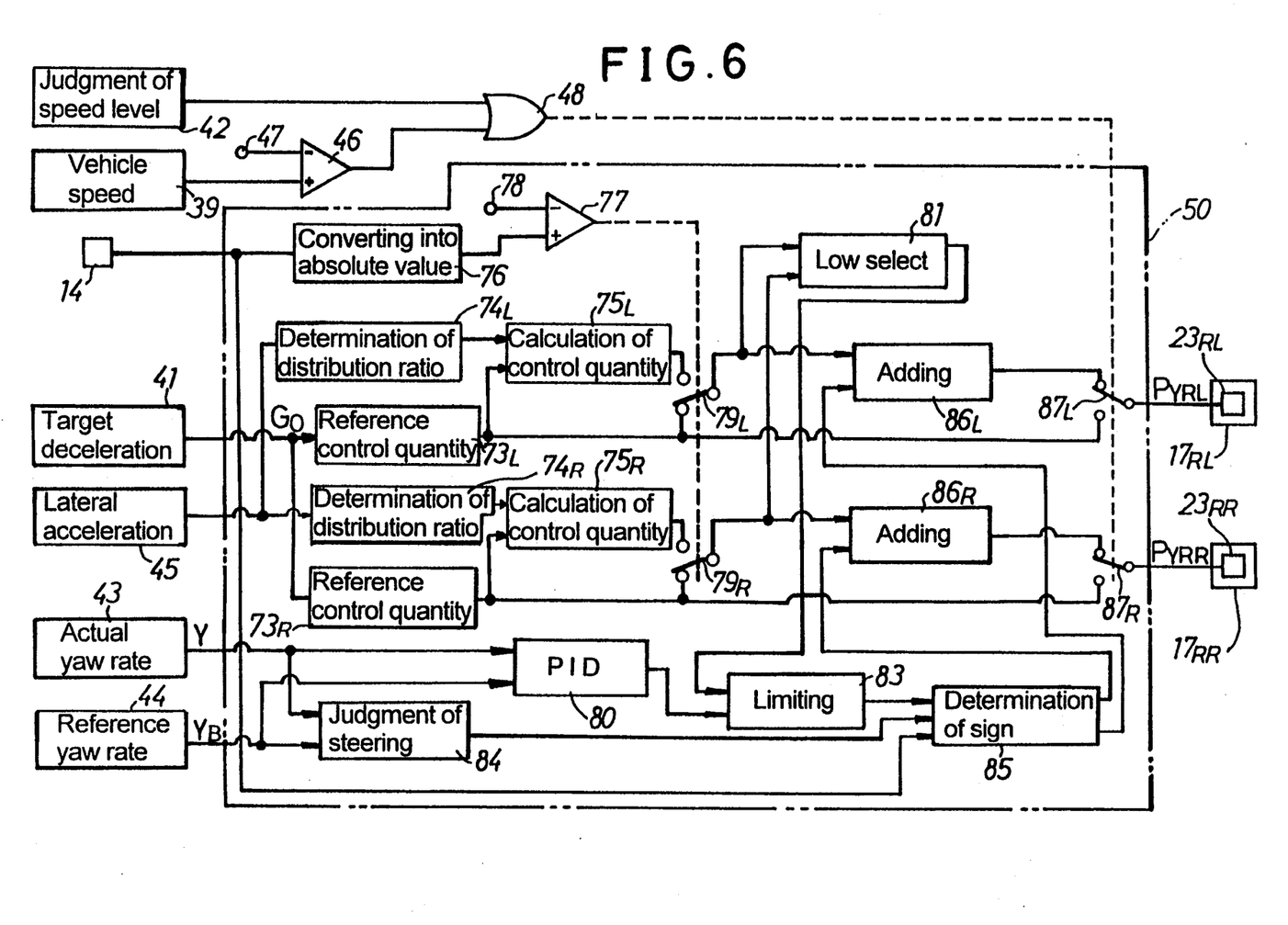
FIG. 6 is a block diagram illustrating the arrangement of a rear wheel-side control section.

Referring to FIG. 6, the rear wheel-side control section 50 provides a difference between the braking forces of the left and right rear wheels on the basis of a difference between the reference yaw rate $Y_B$ determined in the reference yaw rate determining means 44 and the actual yaw rate Y detected by the actual yaw rate detecting means 43.

The rear wheel-side control section 50 includes reference control quantity determining means $73_L$ and $73_R$ for determining reference control quantities for the linear solenoids $23_{RL}$ and $23_{RR}$ for the left and right rear brakes on the basis of the target deceleration $G_0$ obtained in the target deceleration determining means 41; distribution ratio determining means $74_L$ and $74_R$ for determining a distribution ratio of the braking forces of the left and right rear brakes $B_{RL}$ and $B_{RR}$ respectively on the basis of the lateral acceleration obtained in the lateral acceleration evaluating means 45; control quantity calculating means $75_L$ and $75_R$ for calculating control quantities for the linear solenoids $23_{RL}$ and $23_{RR}$, respectively, on the basis of reference control quantities determined in the reference control quantity determining means $73_L$ and $73_R$ and on the basis of the distribution ratio determined in the distribution ratio determining means $74_L$ and $74_R$; an absolute value conversion means 76 for converting a detection value detected by the steering sensor 14 into an absolute value; a comparator 77 for outputting a high level signal when the steering angle which has been made into the absolute value in the absolute value conversion means 76 exceeds a judgment steering angle, e.g., 30 degree, received thereto from an reference terminal 78; switch means $79_L$ and $79_R$ for switching over following two states from one to another: a state 1) in which outputs from the reference control quantity determining means $73_L$ and $73_R$ are selected when the output from the comparator 77 is of a low level, and a state 2) in which outputs from the control quantity calculating means $75_L$ and $75_R$ are selected when the output from the comparator 77 is of a high level; a PID calculating means 80 for calculating a PID control quantity on the basis of the deviation between the reference yaw rate $Y_B$, determined in the reference yaw rate determining means 44, and the actual yaw rate Y, detected by the actual yaw rate detecting means 43; a low selection means 81 for selecting lower one of output signals from the switch means $79_L$ and $79_R$; a limiting means for limiting an Output from the PID calculating means 80 such that an output from the low selection means 81 becomes a maximum value; a steered-state judging means 84 for judging whether the vehicle is in an under-steered state or in an over-steered state on the basis of the reference yaw rate $Y_B$ and the actual yaw rate Y; a sign determining means 85 for selectively adding a "+" or "−" sign to an output from the limiting means 83 to output the same on the basis of the detection value detected by the steering sensor 14 and a result of the judgment in the steered-state judging means 84; adding means $86_L$ and $86_R$ for adding, to outputs from the switch means $79_L$ and $79_R$, respectively, the output from the limiting means 83 to which the "+" or "−" sign are affixed; and switch means $87_L$ and $87_R$ for switching over following two states from one to another: a state 1) in which control quantities determined in the adding means $86_L$ and $86_R$ are selected and applied to the linear solenoids $23_{RL}$ and $23_{RR}$ of the modulators $17_{RL}$ and $17_{RR}$, respectively, when the output from the OR gate 48 is of a low level, and a state 2) in which control quantities determined in the reference control quantity determining means $73_L$ and $73_R$ are applied to the linear solenoids $23_{RL}$ and $23_{RR}$, respectively, when the output from the OR gate 48 is of a high level.

The braking force for each of the front wheels is determined in the control quantity calculating circuit 66 in the front wheel-side control section 49 in accordance with the target deceleration $G_0$. The reference control quantity determining means $73_L$ and $73_R$ each determine a control quantity for providing a value which is obtained by equally dividing, into left and right sides, the rear wheel braking forces which is obtained by reducing the braking forces for the front wheels at a given rate. The same control quantity is determined in the reference control quantity determining means $73_L$ and $73_R$. The distribution ratio determining means $74_L$ and $74_R$ each determine a distribution ratio of the braking forces for the left and right rear wheels on the basis of the lateral acceleration. In the control quantity calculating means $75_L$ and $75_R$, the control quantities for providing braking forces of the left and right rear brakes $B_{RL}$ and $B_{RR}$ required during turning of the vehicle are calculated on the basis of the distribution ratio determined in the above manner. The control quantities calculated in the control quantity calculating means $75_L$ and $75_R$ are used only when the leftward or rightward steering angle exceeds, for example, 30 degree. When the leftward or rightward steering angle is equal to or less than 30 degree, the reference control quantities determined in the reference control quantity calculating means $73_L$ and $73_R$ are delivered from the switch means $79_L$ and $79_R$, respectively.

The sign determining means 85 determines that the vehicle is turning leftward or rightward, on the basis of the detection value detected by the steering sensor 14, when the PID calculation quantity which is limited by the limiting means 83 after being calculated in the PID calculating means 80 is to be added by each of the adding means $86_L$ and $86_R$. More specifically, the sign determining means 85 adds, to the output from the limiting means 83, the "−" sign for the inner wheel side and the "+" sign for the outer wheel side, and delivers these values to the respective adding means $86_L$ and 86R, when it has been decided that the vehicle is in the over-steered state, and adds, to the output from the limiting means 83, the "−" sign for the outer wheel side and the "+" sign for the inner wheel side, and delivers these values to the respective adding means $86_L$ and $86_R$, when it has been decided that the vehicle is in the under-steered state, so that the sum total of the braking forces obtained in the rear wheel brakes $B_{RL}$ and $B_{RR}$ is not varied.

In the limiting means 83, when the output from the PID calculating means 80 is equal to or more than an output from the low selection means 81, i.e., lower one of the outputs from the switch means $79_L$ and $79_R$, the output from the PID calculating means 80 is limited in the limiting means 83 by use of lower one of the outputs from the switch means $79_L$ and $79_R$ as the maximum value, thereby avoiding that the control quantity assumes a negative value in each of the adding means $86_L$ and $86_R$.

By such a rear wheel control section 50, when the vehicle speed $V_V$ is equal to or more than 10 km/hr and the speed of operation of the brake pedal $P_B$ is slow, the linear solenoids $23_{RL}$ and $23_{RR}$ in the modulators $17_{RL}$ and $17_{RR}$ are independently controlled in a feed-back manner on the basis of operation control quantities $P_Y$RL and $P_Y$RR obtained by subjecting, to a PID correction, the control quantities determined by the target deceleration $G_0$ and the reference yaw rate $Y_B$. On the other hand, either when the speed of operation of the brake pedal $P_B$ is fast, or when the vehicle speed $V_V$ is less than 10 km/hr, the linear solenoids $23_{RL}$ and $23_{RR}$ in the modulators $17_{RL}$ and $17_{RR}$ are independently controlled in an open manner on the basis of the control quantities $P_Y$RL and $P_Y$RR determined by the target deceleration $G_0$ and the reference yaw rate $Y_B$.

The operation of this embodiment will be described below. The front wheel-side control section 49 collectively controls the linear solenoids $23_{FL}$ and $23_{FR}$ of the modulators $17_{FL}$ and $17_{FR}$, so that the deceleration G is equal to the target deceleration $G_0$, thereby to control the braking forces of the front wheels $B_{FL}$ and $B_{FR}$ to the same level. The rear wheel-side control section 50 independently controls the linear solenoids $23_{RL}$ and $23_{RR}$ of the modulators $17_{RL}$ and $17_{RR}$, so that the actual yaw rate Y at the actual turning level is equal to the reference yaw rate $Y_B$ at the target turning level, thereby to produce a difference between the braking forces of the rear wheel brakes $B_{RL}$ and $B_{RR}$. Thus, it is possible to perform the control of the deceleration for the front wheels $W_{FL}$ and $W_{FR}$ in which the load is increased during braking, and to perform the control of the turning for the rear wheels $W_{RL}$ and $W_{RR}$ which largely contribute to the control of the turning, thereby to provide a sufficient braking force while stabilizing the behavior of the vehicle during braking in turning of the vehicle.

In addition, by controlling the linear solenoids $23_{FL}$ and $23_{FR}$ of the modulators $17_{FL}$ and $17_{FR}$ by the front wheel-side control section 49, it is possible to avoid the generation of an overshooting to improve the responsiveness of the control. Also, it is possible to eliminate an influence of pitching during traveling of the vehicle. The control of braking force corresponding to a variation in quantity of operation of the brakes shown in FIG. 7 by the front wheel-side control section 49 will be described below.

Figure 7:
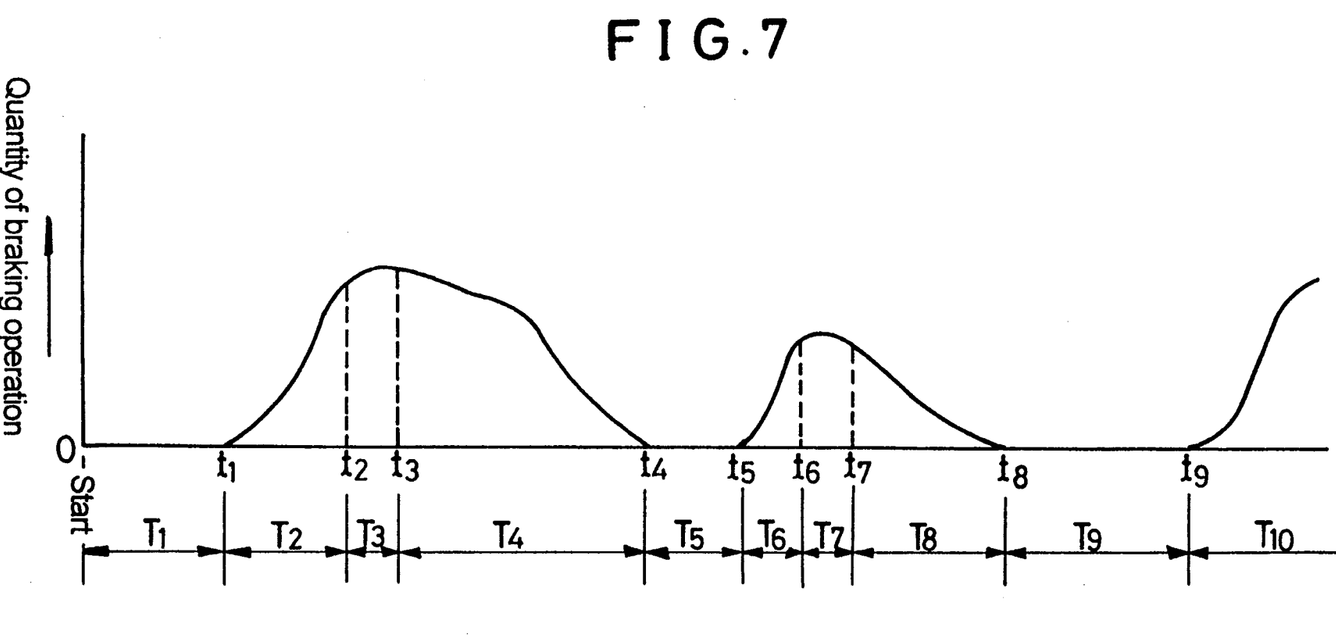
FIG. 7 is a diagram illustrating one example of a variation in quantity of operation of a brake operating member.

For a period $T_1$ from the start of the control section 49 to a time point $t_1$ at which the braking operation is started, an initial setting is performed. For a period $T_2$ from the time point $t_1$ to a time point $t_2$, the open control of the linear solenoids $23_{FL}$ and $23_{FR}$ is carried out by using a value calculated in the control quantity calculating circuit 66 as the operation control quantity $P_{YF}$ in response to the speed-level judging means 42 judging that the operation of the brakes is fast. This insures a quick responsiveness, but also eliminates an influence of pitching generated in the vehicle because the deceleration used by the deceleration sensor 15 in the control is not used. At this time, since this is a first fast braking (hard braking) after the start of the control section 49, the value of $\alpha_0$ used in the calculation in the control quantity calculating circuit 66 is a value received thereto from the reference terminal 69.

When the braking operation is shifted into a slow or low-speed braking operation at the time point $t_2$, a low level signal indicative of the slow braking operation is delivered from the speed-level judging means 42 at a time point $t_3$ outputted by a delay time determined in the speed-level judging means 42. For a period $T_3$ from the time point $t_2$ to the time point $t_3$, the open control remains continued, thereby avoiding the generation of a hunting to provide a stabilization of the control.

For a period $T_4$, from the time point $t_3$ to a time point $t_4$ at which the braking is once ended, the feed-back control of the linear solenoids $23_{FL}$ and $23_{FR}$ of the modulators $17_{FL}$ and $17_{FR}$ is carried out using the operation control quantity $P_{YF}$ determined in the deviation reference control quantity determining means 61. But this feed-back control is carried out after the completion of the open control corresponding to the fast braking. Therefore, a cause of an overshooting is already not present, thereby ensuring that the linear solenoids $23_{FL}$ and $23_{FR}$ are controlled, such that the deceleration G is equal to the target deceleration $G_0$. Moreover, for this period $T_4$, a calculation for averaging the past four values of $\alpha$ sequentially inputted from the input/output relation calculating circuit 67 to provide an average value $\alpha_{NEXT}$ is repeatedly performed in the hysteresis calculating circuit 68.

When the braking operation is restarted at a time point $t_5$, a period $T_5$, from the time point $t_4$ to a time point $t_5$, is a period for ascertaining whether or not the value calculated in the hysteresis calculating circuit 68 should be returned to the initial value, until the braking pressure is stabilized. If the period $T_5$ is shorter than the delay time set in the operation-end judging circuit 41, the value calculated in the hysteresis calculating circuit 68 is not returned to the initial value.

If it is decided that the braking is fast for a period $T_6$ from the time point $t_5$ to a time point $t_6$, because the period $T_5$ was shorter than the delay time set in the operation-end judging circuit 41, a calculation using the value $\alpha_{NEXT}$, calculated during the feed-back control for the period $T_4$, is carried out in the control quantity calculating circuit 66, and by the open control based thereon, the linear solenoids $23_{FL}$ and $23_{FR}$ are controlled. Moreover, in this open control, the relationship between the target deceleration $G_0$ and the control quantity $P_{YF}$ is changed in the control quantity calculating circuit 66 on the basis of the past hysteresis of the relationship between the target deceleration $G_0$ and the control quantity $P_{YF}$ in the execution of the latest feed-back control. Therefore, even if the operation characteristic of the brakes $B_{FL}$ and $B_{FR}$ relative to the control quantity has been varied due to wearing of friction pads in the brakes $B_{FL}$ and $B_{FR}$, a variation in temperature and the like, an appropriate control quantity corresponding to such variations in situations can be obtained, and the convergence of the opening control can be improved.

A period $T_7$ between the time point $t_6$ at which the fast braking is ended and a time point $t_7$ at which the delay time set in the speed-level judging means 42 is lapsed is similar to the above-described period $T_3$, and a period $T_8$ from the time point $t_7$ to a time point $t_8$ at which the slow braking is ended is similar to the above-described period $T_4$.

If the braking operation is restarted at a time point $t_9$, after a lapse of a period $T_9$ lounger than the delay time set in the operation-end judging means 40 from the time point $t_8$, the calculation value in the hysteresis calculating circuit 68 is returned to the initial value with the delivery of a high level signal from the operation-end judging means 40.

If the braking operation started at the time point $t_9$ is fast, the control similar to that for the above-described period $T_2$ is carried out for a period $T_{10}$ during which the fast braking is continued.

Although the embodiment of the present invention has been described in detail, it will be understood that the present invention is not limited to the above-described embodiment, and various modifications in design can be made without departing from the spirit and scope of the invention defined in claims.

For example, the deceleration G of the vehicle may be obtained by differentiation of the vehicle speed $V_V$. And in place of the target deceleration $G_0$, the detection value detected by the load cell 13 or the calculation value determined in the control quantity calculating circuit 66 may be used as a value determined on the basis of the operation quantity detected by the load cell 13. Further, in place of the deceleration G detected by the deceleration sensor 15, the calculation value determined in the PID calculating circuit 64 or the control quantity determined in the adding circuit 65 may be used.

What is claimed is:

1. A braking force control system of a vehicle, comprising an actuator for adjusting a braking force of a wheel brake, an operation quantity detecting means for detecting the quantity of operation of a brake operating member, a target deceleration determining means for determining a target deceleration of the vehicle on the basis of the operation quantity detected by the operation quantity detecting means, a deceleration detecting means for detecting a deceleration of the vehicle, a deviation reference control quantity determining means for determining an operation control quantity of the actuator on the basis of a deviation between the target deceleration determined in the target deceleration determining means and the deceleration detected by the deceleration detecting means, an operation-quantity reference control quantity determining means for determining an operation control quantity of the actuator on the basis of the operation quantity detected by the operation quantity detecting means, a speed-level judging means for judging a level of speed of operation of the brake operating member in accordance with whether or not the variation per unit time in operation quantity detected by the operation quantity detecting means exceeds a preset value, and a switch means for switching over following states from one to another: a state 1) in which the operation of the actuator is controlled in accordance with the operation control quantity determined in the deviation reference control quantity determining means, when it is decided in the speed-level judging means that the operation speed is slow, and a state 2) in which the operation of the actuator is controlled in accordance with the operation control quantity determined in the operation-quantity reference control quantity determining means, when it is decided in the speed-level judging means that the operation speed is fast.

2. A braking force control system in a vehicle according to claim 1, wherein said operation-quantity reference control quantity determining means changes a relation between the quantity of operation detected by the operation quantity detecting means and the operation control quantity of the actuator on the basis of a hysteresis of a last relation between a value determined on the basis of the quantity of operation detected by the operation quantity detecting means and a value determined on the basis of the deceleration detected by the deceleration detecting means when the speed-level judging means judges that the operation speed is changed from a slow state to a fast state.

3. A braking force control system of a vehicle, comprising a fluid pressure circuit for applying a braking fluid pressure to a wheel brake, an operation quantity detecting means for detecting a quantity of operation of a brake operating member, a target deceleration determining means for determining a target deceleration of the vehicle on the basis of the operation quantity detected by the operation quantity detecting means, a deceleration detecting means for detecting a deceleration of the vehicle, a means for feed-back controlling the braking fluid pressure on the basis of the target deceleration determined in the target deceleration determining means as well as the deceleration detected by the deceleration detecting means, a means for open controlling the braking fluid pressure on the basis of the operation quantity detected by the operation quantity detecting means, a speed-level judging means for judging a level of speed of operation of the brake operating member in accordance with whether or not the variation per unit time in operation quantity detected by the operation quantity detecting means exceeds a preset value, and a switch means for selecting the feed-back control when it is decided in the speed-level judging means that the operation speed is slow, and for selecting the open control when it is decided in the speed-level judging means that the operation speed is fast.

4. A braking force control system of a vehicle, comprising an adjusting means for adjusting the speed of a vehicle in accordance with the quantity of operation of a brake operating member, an operation quantity detecting means for detecting the quantity of operation of the operating member, a speed variation detecting means for detecting a variation in speed of the vehicle, a means for feed-back controlling the adjusting means on the basis of a target value based on the operation quantity detected by the operation quantity detecting means and a detection value based on the variation in speed of the vehicle detected by the speed variation detecting means, a means for open controlling the adjusting means on the basis of the operation quantity detected by the operation quantity detecting means, a speed-level judging means for judging a level of speed of operation of the brake operating member in accordance with whether or not the variation per unit time in operation quantity detected by the operation quantity detecting means exceeds a preset value, and a switch means for selecting the feed-back control when it is decided in the speed-level judging means that the operation speed is slow, and for selecting the open control when it is decided in the speed-level judging means that the operation speed is fast.

* * * * *